(12) United States Patent
Lin

(10) Patent No.: US 10,372,243 B2
(45) Date of Patent: Aug. 6, 2019

(54) INPUT DEVICE, MOUSE USING THE SAME AND METHOD USING THE SAME

(71) Applicants: BenQ CO., LTD., Shanghai (CN); BENQ CORPORATION, Taipei (TW)

(72) Inventor: Hsin-Nan Lin, New Taipei (TW)

(73) Assignees: BenQ Intelligent Technology (Shanghai) Co., Ltd, Shanghai (CN); BENQ CORPORATION, Taipei (TW)

(*) Notice: Subject to any disclaimer, the term of this patent is extended or adjusted under 35 U.S.C. 154(b) by 268 days.

(21) Appl. No.: 15/494,560

(22) Filed: Apr. 24, 2017

(65) Prior Publication Data

US 2018/0039336 A1 Feb. 8, 2018

(30) Foreign Application Priority Data

Aug. 5, 2016 (CN) .......................... 2016 1 0637765

(51) Int. Cl.
*G06F 3/038* (2013.01)
*H02H 9/04* (2006.01)
*G06F 3/0354* (2013.01)

(52) U.S. Cl.
CPC ............ *G06F 3/038* (2013.01); *G06F 3/0383* (2013.01); *G06F 3/03543* (2013.01)

(58) Field of Classification Search
CPC ..... G06F 3/038; G06F 3/03543; G06F 3/0383
See application file for complete search history.

(56) References Cited

U.S. PATENT DOCUMENTS

| | | | | |
|---|---|---|---|---|
| 5,680,157 A * | 10/1997 | Bidiville | ............... | G06F 3/0312 345/163 |
| 7,663,354 B2 | 2/2010 | Kudo et al. | | |
| 2003/0231012 A1* | 12/2003 | Corva | ................... | H02M 3/156 323/285 |
| 2007/0176868 A1* | 8/2007 | Lee | ..................... | G02F 1/13306 345/87 |
| 2013/0120260 A1* | 5/2013 | Piot | ..................... | G06F 3/03541 345/163 |

FOREIGN PATENT DOCUMENTS

| | | |
|---|---|---|
| CN | 101271367 A | 9/2008 |
| CN | 101473542 A | 7/2009 |
| CN | 102082146 A | 6/2011 |
| TW | I374601 B | 10/2012 |

OTHER PUBLICATIONS

Office action of counterpart application by Taiwan IP Office dated Jul. 31, 2017.
Office action of counterpart application by SIPO dated Aug. 2, 2018.

* cited by examiner

*Primary Examiner* — Chanh D Nguyen
*Assistant Examiner* — Nguyen H Truong

(57) ABSTRACT

An input device, a mouse using the same and a method using the same are provided. The input device capable of avoiding error action of a switch includes a first g diode, a second diode and a switch. The second diode is electrically connected to the first diode. The switch is electrically connected to between the first diode and the second diode.

7 Claims, 2 Drawing Sheets

INPUT DEVICE, MOUSE USING THE SAME AND METHOD USING THE SAME

This application claims the benefit of People's Republic of China application Serial No. 201610637765.5, filed Aug. 5, 2016, the subject matter of which is incorporated herein by reference.

BACKGROUND OF THE INVENTION

Field of the Invention

The invention relates in general to an input device, a mouse using the same and a method using the same, and more particularly to an input device capable of avoiding error action of a switch, a mouse using the same and a method using the same.

Description of the Related Art

In general, an input device, such as a mouse, may operate an electronic device connecting to the input device by triggering its switch. However, when a finger triggers the switch once, sometimes, the static electricity on the finger may invade a circuit board through the switch, and accordingly it causes the circuit board to detect multi-click. Alternatively, when the user slightly touches the switch, it is possible that the static electricity on the finger cause the circuit board to detect the click even if the switch is not triggered actually.

Thus, it has become a prominent task for the industries to provide a new technique for resolving above problem.

SUMMARY OF THE INVENTION

The invention is directed to an input device capable of avoiding an error action of a switch, a mouse using the same and a method using the same.

According to one embodiment of the present invention, an input device includes a first diode, a second diode and a switch. The second diode is electrically connected to the first diode. The switch is electrically connected to between the first diode and the second diode.

According to another embodiment of the present invention, a method includes the following steps. Whether an electric potential of a switch changes to a second level from a first level is determined; and if the electric potential of the switch changes to the second level from the first level, a first noise between the first level and the second level is ignored.

According to another embodiment of the present invention, a mouse includes a casing, a circuit board, a first diode, a second diode, a switch and a controller. The circuit board disposed on the casing. The second diode is electrically connected to the first diode. The switch is electrically connected to between the first diode and the second diode. The controller is connected to the switch, wherein the first diode, the second diode, the switch and the controller are disposed on the circuit board.

The above and other aspects of the invention will become better understood with regard to the following detailed description of the preferred but non-limiting embodiment(s). The following description is made with reference to the accompanying drawings.

DETAILED DESCRIPTION OF THE INVENTION

Figure 1A:
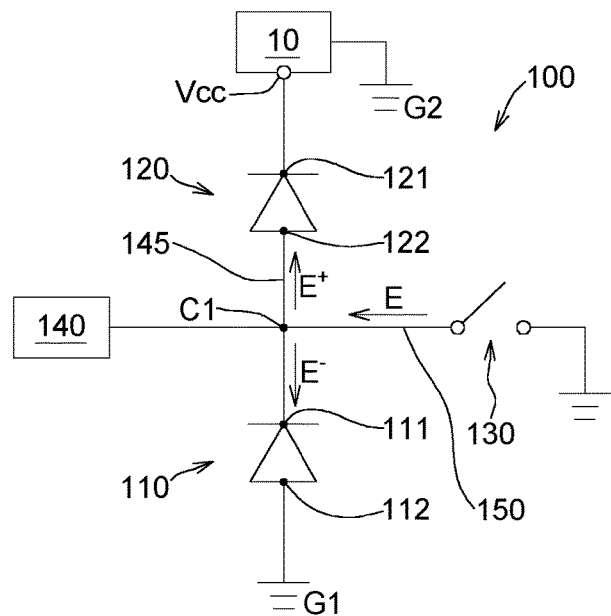
FIG. 1A is a diagram of functional blocks of an input device according to an embodiment of the invention.
Figure 1B:
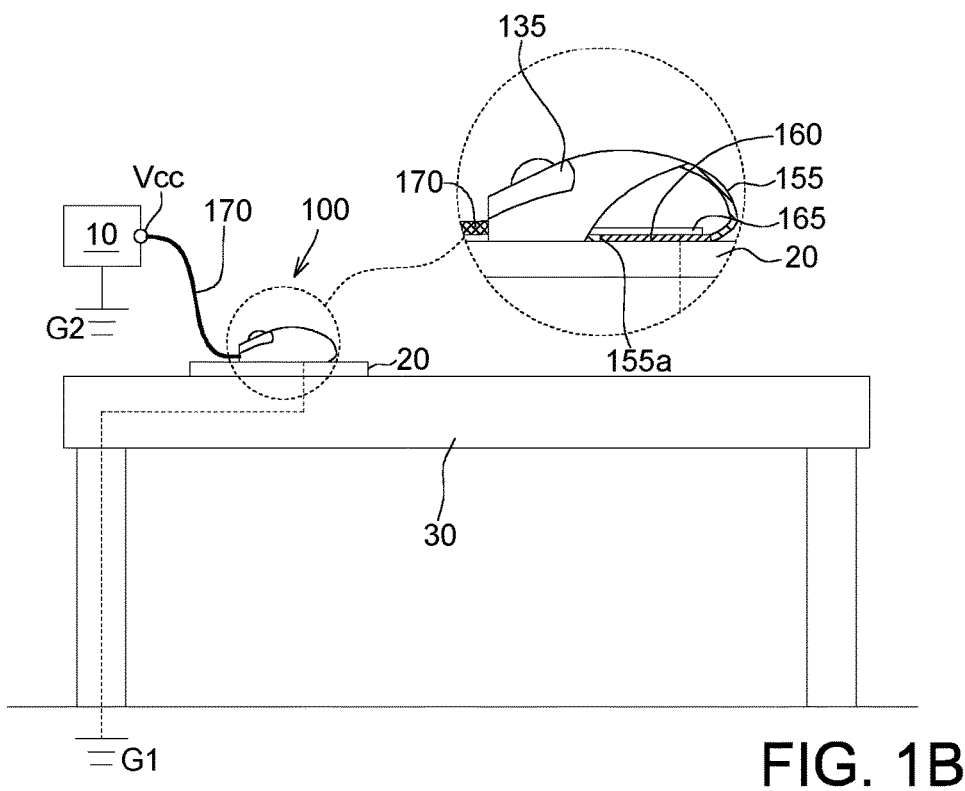
FIG. 1B is a schematic diagram of the input device placed on a table.

FIG. 1A is a diagram of functional blocks of an input device 100 according to an embodiment of the invention, and FIG. 1B is a schematic diagram of the input device 100 placed on a table 30.

The input device 100 of the present embodiment is, for example, a mouse. In another embodiment, the input device 100 may be a keyboard, an input interface of a home appliance or other electronic device having a mechanical switch. As shown in FIG. 1A, the input device 100 includes a first diode 110, a second diode 120, at least one switch 130, at least one button 135 (as shown in FIG. 1B), a controller 140, a first conductive wire 145, a second conductive wire 150, a casing 155 (as shown in FIG. 1B), a conductive portion 160 (as shown in FIG. 1B), a circuit board 165 (as shown in FIG. 1B) and a connection wire 170 (as shown in FIG. 1B).

The switch 130, the first diode 110, the second diode 120, the controller 140, the first conductive wire 145 and the second conductive wire 150 are disposed on the circuit board 165. The button 135 is disposed above the switch 130, and a user may trigger the switch 130 by pushing the button 135 for operating the electronic device 10 connected to the input device 100. The electronic device 10 is, for example, a device controlled by the input device 100, and the device is, for example, a computer host, a display, a home appliance, etc.

The first diode 110 is electrically connected to the second diode 120, and the switch 130 is electrically connected to between the first diode 110 and the second diode 120. As a result, static electricity E invading the inside of the input device 100 may be guided to a second grounding electric potential G2 through the second diode 120 or guided to a first grounding electric potential G1 through the first diode 110.

As shown in FIG. 1A, the first diode 110 and the second diode 120 are connected in series. For example, the first diode 110 has a negative electrode 111 and a positive electrode 112, and the second diode 120 has a negative electrode 121 and a positive electrode 122, wherein the negative electrode 111 of the first diode 110 and the positive electrode 122 of the second diode 120 are connected by the first conductive wire 145. In addition, the positive electrode 112 of the first diode 110 is electrically connected to the first grounding electric potential G1, such that the static electricity may be guided to the first grounding electric potential G1 through the first diode 110.

The switch 130 and the controller 140 are connected by the second conductive wire 150. The first conductive wire 145 and the second conductive wire 150 are connected at a connection point C1. The switch 130 and the controller 140 are connected to between the first diode 110 and the second diode 120 in parallel. As a result, before the static electricity E occurring in the second conductive wire 150 invades the controller 140, the static electricity E may be guided to the grounding electric potential through the first diode 110 or the second diode 120.

As shown in FIG. 1A, when a negative static electricity E⁻ occurs, the negative static electricity E⁻ may be guided to the first grounding electric potential G1 through the first diode 110. A static electricity guide path for the negative static electricity E⁻ passes through the second conductive wire 150 between the switch 130 and the connection point C1, the first conductive wire 145, the first diode 110 and the first grounding electric potential G1 in order.

As shown in FIG. 1B, the casing 155 has a bottom opening 155a, and at least one portion of the casing 155 may be made of metal conductive material. The conductive portion 160 is disposed on the bottom opening 155a of the casing 155 for touching a pad 20 or the table 30. The pad 20 is, for example, a mouse pad. The conductive portion 160 may be a portion of metal casing of the input device 100, or a conductive component which is independent from the casing and projects from or is exposed from the casing. The positive electrode 112 of the first diode 110 may be electrically connected to the first grounding electric potential G1 through the conductive portion 160, such that the static electricity guide path for the negative static electricity E⁻ passes through the second conductive wire 150 between the switch 130 and the connection point C1, the first conductive wire 145, the first diode 110, the pad 20, the table 30 and the first grounding electric potential G1. The pad 20 has a conductive wire or is made of conductive material, such that the negative static electricity E⁻ may be guided to the first grounding electric potential G1. Similarly, the table 30 has a conductive wire or is made of conductive material, such that the negative static electricity E⁻ may be guided to the first grounding electric potential G1. When the input device 100 is the keyboard, the static electricity guide path for the negative static electricity E⁻ may not pass through the pad 20. When the input device 100 is other kind of device, the static electricity guide path for the negative static electricity E⁻ may not pass through the pad 20 and the table 30.

As shown in FIG. 1A, a positive static electricity E⁺ may be guided to the second grounding electric potential G2 through the second diode 120. In the present embodiment, the positive static electricity E⁺ may be guided to a circuit electric potential Vcc of the electronic device 10, and then be guided to the second grounding electric potential G2 connected to the electronic device 10. The negative electrode 111 of the first diode 110 is electrically connected to the positive electrode 122 of the second diode 120. The negative electrode 121 of the second diode 120 is electrically connected to the circuit electric potential Vcc of the electronic device 10 and electrically connected to the second grounding electric potential G2 through the circuit electric potential Vcc. The connection wire 170 extends outwardly from the casing 155 for electrically connecting the negative electrode 121 of the second diode 120 to the circuit electric potential Vcc of the electronic device 10. As a result, the static electricity guide path for the positive static electricity E⁺ may pass through the second conductive wire 150 between the switch 130 and the connection point C1, the first conductive wire 145, the second diode 120, the connection wire 170, the circuit electric potential Vcc of the electronic device 10 and the second grounding electric potential G2 in order.

Figure 2A:
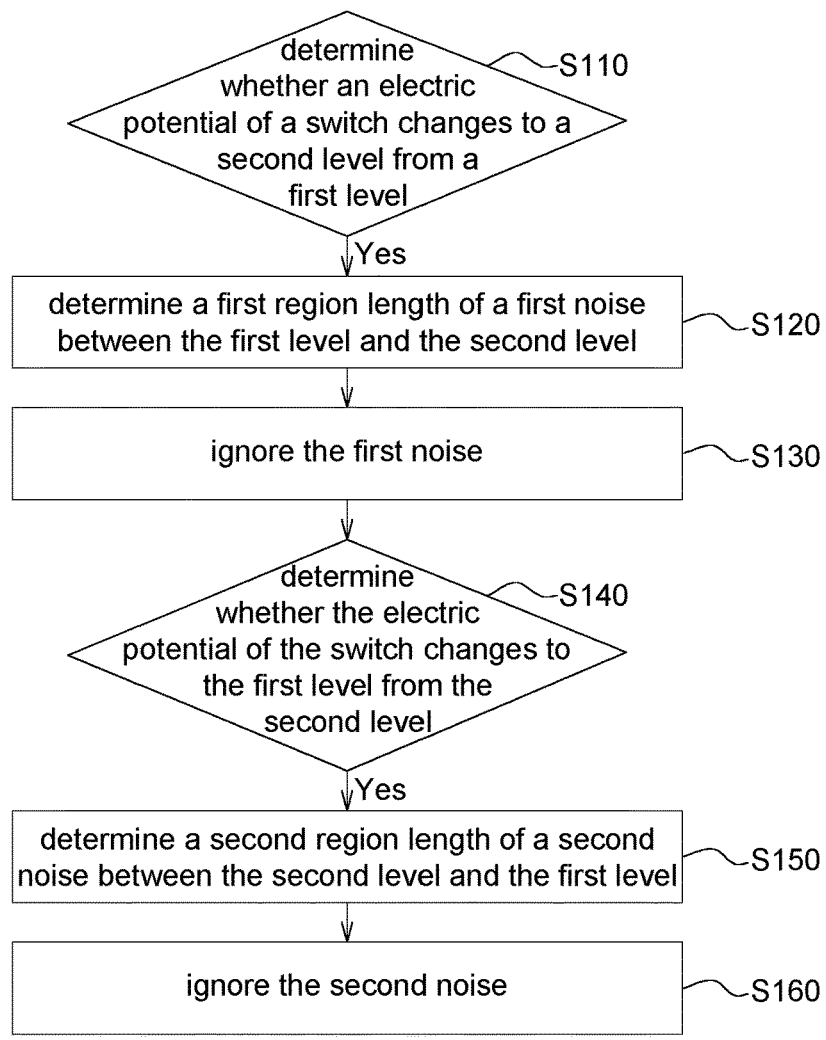
FIG. 2A is a flowchart of method capable of avoiding error action of the switch according to another embodiment of the invention.
Figure 2B:
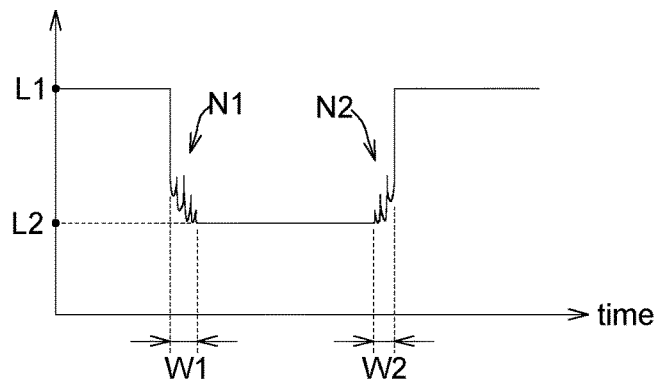
FIG. 2B is a schematic diagram of an electric potential of the input device of FIG. 1A changing.

FIG. 2A is a flowchart of method capable of avoiding error action of the switch according to another embodiment of the invention, and FIG. 2B is a schematic diagram of an electric potential V1 of the input device 100 of FIG. 1A changing.

In step S110, as shown in FIG. 2B, the controller 140 of the input device 100 determines whether the electric potential V1 of the switch 130 changes to a second level L2 from a first level L1, wherein the second level L2 is lower than the first level L1, and the second level L2 is larger than or equal to zero. Furthermore, when the switch 130 is not triggered, the electric potential V1 may be in a status of the first level L1. When the switch 130 is triggered, the electric potential V1 may changes to second level L2 and the process proceeds to the step S120. If the switch 130 is not triggered, the process continues to await the change of signal.

In the step S120, when the electric potential V1 of the switch 130 changes to the second level L2 from the first level L1, it means the switch 130 is triggered. Therefore, the controller 140 determines a first time interval W1 of the first noise N1 between the first level L1 and the second level L2 for determining the region of the first noise N1.

In the step S130, the first noise N1 between the first level L1 and the second level L2 is ignored. For example, a first time interval W1 of the first noise N1 is skipped for avoiding the error action of the switch. In detail, due to the inherent factors of the switch 130 in machine, the noise is inevitably generated when the switch 130 is triggered. If the controller 140 considers the fluctuation of the first noise N1, it is possible for the controller 140 to wrongly detect the multi-click on the switch 130 and thus to output multi signals (error action). In the present embodiment, due to the controller 140 ignores the first noise N1, and accordingly it can avoid or solve the problem of the error action.

In the step S140, the controller 140 determines whether the electric potential V1 of the switch 130 changes to the first level L1 from the second level L2. For example, when the switch 130 is in a sustained triggering status (for example, the switch 130 keeps pushed and not released), the electric potential V1 keeps at the second level L2. When the switch 130 is released, the electric potential V1 changes to the first level L1 from the second level L2, and then the process proceeds to the step S150; if not, the process continues to await the change of signal.

In the step S150, when the electric potential V1 of the switch 130 changes to the first level L1 from the second level L2, it means the switch 130 is triggered. Therefore, controller 140 determines a second time interval W2 of the second noise N2 between the first level L1 and the second level L2 for determining the region of the second noise N2.

In the step S160, the second noise N2 between the first level L1 and the second level L2 is ignored. For example, the second time interval W2 of the second noise N2 is skipped for avoiding the error action of the switch. In detail, due to the inherent factors of the switch 130 in machine, the noise is inevitably generated when the switch 130 is triggered. If the controller 140 considers the fluctuation of the second noise N2, it is possible for the controller 140 to wrongly detect the multi-click on the switch 130 and thus to output multi signals (error action). In the present embodiment, due to the controller 140 ignores the second noise N2, and accordingly it can avoid or solve the problem of the error action.

In addition, the processes of avoiding error action of the switch in the embodiment(s) of the present invention may be implemented by software or firmware. The software or firmware may be loaded in by the processor 140 to perform the above processes of avoiding error action of the switch.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An input device, comprising:
   a first diode;
   a second diode electrically connected to the first diode; and
   a switch electrically connected to between the first diode and the second diode;
   wherein a negative electrode of the first diode is connected to a positive electrode of the second diode, and a positive electrode of the first diode is electrically connected to a first grounding electric potential; and
   wherein the input device further comprises:
   a casing having a bottom opening; and
   a conductive portion disposed on the bottom opening of the casing;
   wherein the positive electrode of the first diode is electrically connected to the first grounding electric potential through the conductive portion.

2. The input device according to claim 1, wherein the first diode and the second diode are connected in serial, the switch is connected to between the first diode and the second diode in parallel, and the input device further comprises:
   a controller connected to between the first diode and the second diode in parallel.

3. The input device according to claim 1, wherein a static electricity guide path for a negative static electricity passes through the first diode, the conductive portion and the first grounding electric potential in order.

4. A mouse, comprising:
   a casing;
   a circuit board disposed on the casing;
   a first diode;
   a second diode electrically connected to the first diode; and
   a switch electrically connected to between the first diode and the second diode; and
   a controller connected to the switch, wherein the first diode, the second diode, the switch and the controller are disposed on the circuit board;
   wherein a negative electrode of the first diode is connected to a positive electrode of the second diode, and a positive electrode of the first diode is electrically connected to a first grounding electric potential; and
   wherein the mouse according further comprises:
   a conductive portion disposed on a bottom opening of the casing;
   wherein the positive electrode of the first diode is electrically connected to the first grounding electric potential through the conductive portion.

5. The mouse according to claim 4, wherein the first diode and the second diode are connected in serial, the switch is connected to between the first diode and the second diode in parallel, and the controller is connected to between the first diode and the second diode in parallel.

6. The mouse according to claim 4, wherein a static electricity guide path for a negative static electricity passes through the first diode, the conductive portion and the first grounding electric potential in order.

7. An input device, comprising:
   a first diode;
   a second diode electrically connected to the first diode; and
   a switch electrically connected to between the first diode and the second diode;
   wherein a negative electrode of the first diode is connected to a positive electrode of the second diode, a negative electrode of the second diode is electrically connected to a second grounding electric potential through a circuit electric potential of an electronic device, and the input device further comprise:
   a casing; and
   a connection wire extending outwardly from the casing and electrically connected the negative electrode of the second diode to the circuit electric potential of the electronic device;
   wherein a static electricity guide path for a positive static electricity passes through the second diode, the connection wire, the circuit electric potential and the second grounding electric potential.

* * * * *